No. 849,900. PATENTED APR. 9, 1907.
O. G. HEIMSTÄDT.
SINGLE CEMENTED OBJECTIVE LENS, ALSO APPLICABLE AS DOUBLE OBJECTIVE.
APPLICATION FILED DEC. 24, 1902.

UNITED STATES PATENT OFFICE.

OSKAR GUSTAV HEIMSTÄDT, OF VIENNA, AUSTRIA-HUNGARY.

SINGLE CEMENTED OBJECTIVE-LENS, ALSO APPLICABLE AS DOUBLE OBJECTIVES.

No. 849,900.　　　　　Specification of Letters Patent.　　　　　Patented April 9, 1907.

Application filed December 24, 1902. Serial No. 136,495.

*To all whom it may concern:*

Be it known that I, OSKAR GUSTAV HEIMSTÄDT, a subject of the Emperor of Germany, residing at Vienna, in the Province of Lower Austria, in the Empire of Austria-Hungary, have invented certain new and useful Improvements in Single Cemented Objective-Lenses, also Applicable as Double Objectives; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to objectives for photographic purposes; and it has for its object the production of a compound objective by the peculiar arrangement of which astigmatism as well as spherical and chromatic aberration are obviated and a better focusing of those rays which are non-parallel to the axis is attained. Furthermore, the improved system permits to attain a more perfect astigmatic correction than could be attained by any other optical system of lenses.

Figure 1:
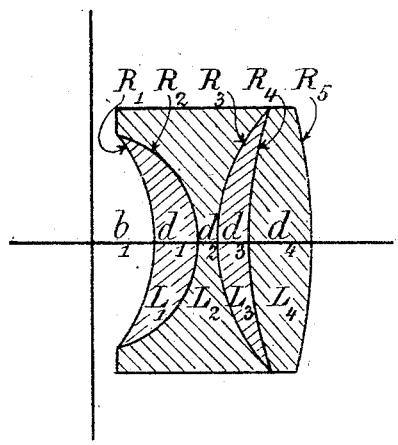
Figure 2:
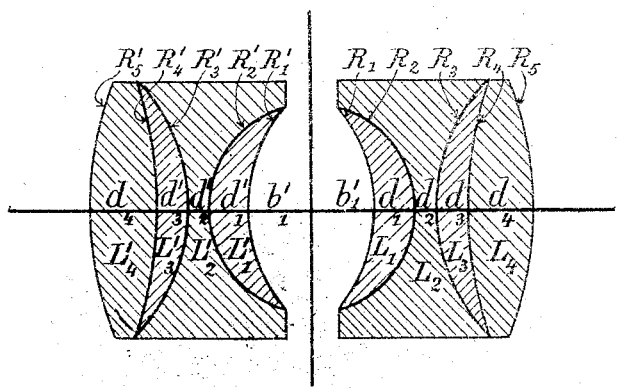

Referring to the drawings, in which like parts are similarly designated, Figure 1 is a vertical central section of an objective, and Fig. 2 is like view of a double objective.

This compound objective is composed of four cemented lenses, as shown in Fig. 1. The diameter of the effective opening—that is to say, of the aperture of the diaphragm—which is placed before the system amounts to about one-twelfth of the focal length of the system. The lenses $L_1$ and $L_3$ are concavo-convex lenses of very low refracting power and of positive effect, and both are made of the same or nearly the same kind of glass. These two lenses must possess a lower refractory power than the biconcave lens $L_2$, which is located between them and which is of intermediate refracting power. The fourth lens $L_4$ is a biconvex lens of highest refractory power.

Fig. 2 of the drawings represents a double objective which is composed of two systems, such as above described, which are symmetrically opposed to one another. The diaphragm is located in the geometrical mean of the whole system. By such an arrangement any possible fault of the original or single system is entirely obviated and the intensity of light (or the luminous power) is quadrupled. The diameter of the free (or effective) opening of this double objective amounts to one-sixth of the focal length.

The construction data of an objective, as shown in Fig. 1, the focal length of which is four hundred and sixteen millimeters, are as follows:

$R_1 = 61.24$ mm.　　$d_1 = 5.5$ mm.
$R_2 = 24.5$ mm.　　$d_2 = 2.5$ mm.
$R_3 = 37.68$ mm.　　$d_3 = 4.3$ mm.
$R_4 = 90.73$ mm.　　$d_4 = 6.7$ mm.
$R_5 = 64.48$ mm.　　$b_1 = 5.5$ mm.
Diameter of diaphragm $= 34$ mm.

Refraction indices of lenses:

$L_1$ and $L_3 = 1.497$.
$L_2 \phantom{\text{ and }L_3} = 1.516$.
$L_4 \phantom{\text{ and }L_3} = 1.612$.

Having thus described my invention, what I claim as new therein, and desire to secure by Letters Patent, is—

1. An objective for photographic purposes, composed of four cemented lenses, said objective consisting of one biconcave lens of intermediate refracting power located between two concavo-convex collecting-lenses of the least refracting power, to one of which the fourth lens of highest refracting power is adjacent.

2. An objective for photographic purposes composed of four cemented lenses, one a biconcave lens of intermediate refracting power located between two concavo-convex collecting-lenses of the least refracting power to one of which the fourth lens of highest refracting power is adjacent, the cemented surface between the concavo-convex lens not adjacent the fourth lens, and the biconvex lens being of the least radius and all other surfaces of a greater radius, substantially as described.

In testimony that I claim the foregoing as my invention I have signed my name in presence of two subscribing witnesses.

OSKAR GUSTAV HEIMSTÄDT.

Witnesses:
　JOSEF RUBARCH,
　ALVESTO S. HOGUE.